(12) United States Patent
Takada

(10) Patent No.: US 6,359,652 B1
(45) Date of Patent: Mar. 19, 2002

(54) MOUNTING STRUCTURE FOR THE PHOTOGRAPHIC ELEMENT OF A CAMERA

(75) Inventor: Noboru Takada, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/025,922

(22) Filed: Feb. 19, 1998

(30) Foreign Application Priority Data

Feb. 20, 1997 (JP) .............................................. 9-051098

(51) Int. Cl.$^7$ .......................... G03B 13/00; H04N 5/225
(52) U.S. Cl. ....................... 348/374; 348/351; 348/376; 235/439; 358/483; 359/823; 396/529
(58) Field of Search ................................. 359/629, 819, 359/830; 396/529; 348/345, 351, 357, 373, 374; 358/482, 483; 235/439, 462.24, 483, 484, 486; G03B 13/00; H04N 5/225

(56) References Cited

U.S. PATENT DOCUMENTS

| | | | |
|---|---|---|---|
| 4,803,557 A | * 2/1989 | Bridges | ....................... 348/374 |
| 5,005,948 A | 4/1991 | Takahashi et al. | .......... 359/819 |
| 5,640,207 A | * 6/1997 | Rahmouni | ................... 348/374 |
| 5,739,853 A | * 4/1998 | Takahashi | ................... 348/335 |
| 5,847,888 A | * 12/1998 | Takahashi | ................... 359/823 |
| 6,117,193 A | * 9/2000 | Glenn | ....................... 29/25.01 |

* cited by examiner

Primary Examiner—Wendy R. Garber
Assistant Examiner—Ngoc-Yen Vu
(74) Attorney, Agent, or Firm—Price and Gess

(57) ABSTRACT

A chassis has plate supporting pillars, insertion holes with engagement pegs, and an aperture brim connected to a lens holding unit. A photographic element package is attached to a plate. Contact surfaces are formed in the aperture brim so that distances from a center axis of a lens holding unit to the two adjacent contact surfaces of the aperture brim are the same as the distances from adjacent standard surfaces of the photographic element package to the center of the photographic element. Plate springs are provided on the mounting member, so that the photographic element package standard surfaces press against the contact surfaces. Plate springs press the plate against the plate supporting pillars. Insertion plates with engagement holes are provided on the mounting member, so that the insertion plates are inserted into the insertion holes and the engagement pegs engage the engagement holes, thereby completing the mounting of the plate on the chassis.

20 Claims, 10 Drawing Sheets

MOUNTING STRUCTURE FOR THE PHOTOGRAPHIC ELEMENT OF A CAMERA

BACKGROUND OF THE INVENTION

1. Field of the Invention

The present invention relates to a mounting structure for the photographic element of a camera which uses a semiconductor element that performs photoelectric transfer, such as a CCD (Charge Coupled Device), as its photographic element.

2. Description of the Related Art

In recent years, there has been rapid development in the field of video cameras that include an optical lens and photographic elements.

FIG. 1 is an exploded perspective view of the conventional mounting structure used to hold the photographic element in a video camera. This mounting structure is composed of a chassis 101 for mounting the optical lens, a substrate 103 for mounting the photographic element 102, and four screws 104–107 for screwing the substrate 103 to the chassis 101.

The chassis 101 features an aperture 108 into which the photographic element 102 is inserted. Connected to the aperture 108 on the side of the chassis 101 that faces away from the substrate 103, a lens cover mounting 109 is formed with a thread in its outer surface. Four substrate supports 110–113 for supporting the substrate 103 are formed at the corners of the chassis 101 on the substrate 103 side. These substrate supports 110–113 feature threaded holes 114–117 for the screws 104–107.

Four holes 118–121 are drilled into the substrate 103 at positions corresponding to the threaded holes 114–117.

FIG. 2 is a cross-section, taken parallel to the optical axis C-C' of the lens, of the mounting structure of FIG. 1 that mounts the photographic element 102.

The mounting method for the photographic element 102 is described below with reference to FIGS. 1 and 2. This photographic element 102 is housed by the protective package 201. Elements such as the pins 202 and 203 of the photographic element 102 are soldered onto the substrate 103 so that the center of the substrate 103 is aligned with the center of the photographic element 102. Here, the solder 204 and 205 may be replaced by sockets fixed to the substrate 103, with the pins 202 and 203 being inserted into the sockets to hold the photographic element 102. After this, screws 104–107 are inserted into the holes 118–121 in the substrate 103 and are screwed into the threaded holes 114–117 of the chassis 101, and, with the substrate 103 loosely attached to the chassis 101, the optical lens cover holding the optical lens is attached to the chassis 101. The photographic element 102 is then attached to a measuring apparatus and while shooting a test pattern or the like, the substrate 103 is repositioned so that the center of the photographic element 102 coincides with the optical axis of the lens. When this position is found, the screws 104–107 are tightened to attach the substrate 103 to the chassis 101.

This mounting structure for photographic element 102 has a major drawback in that it is difficult to solder the photographic element 102 in the dead center of the substrate 103. Also, a considerable amount of time is required to adjust the position of the substrate 103 with the screws 104–107 loosely attached so that the center of the photographic element 102 coincides with the optical axis of the lens, making the assembly process troublesome and requiring special skills. Such adjustment also requires the use of special equipment.

The mounting structure for the photographic element described above suffers from another drawback in that it is necessary to mount a metal cover to reduce the amount of radiation generated by the photographic element 102 and the substrate 103 that would otherwise escape to the periphery.

SUMMARY OF THE INVENTION

In view of the stated problems, it is a first object of the present invention to provide a mounting structure for a photographic element of a camera that does not require equipment for adjustment of the optical axis and that easily adjusts the optical axis.

A second object of the present invention is to provide a mounting structure for the photographic element of a camera that reduces the effects of external radiation on the photographic element and plate and reduces the amount of radiation generated at the photographic element and plate that would otherwise escape to the periphery.

The stated first object can be achieved by a mounting structure for a photographic element of a camera, including: a photographic element package (a) on whose main surface a light-sensitive surface of the photographic element is arranged, (b) in whose side surfaces two standard surfaces that meet at a predetermined angle are formed, and (c) where a center of the light-sensitive surface of the photographic element is defined as a point which is a first offset amount from one of the standard surfaces and a second offset amount from another of the standard surfaces; a chassis (a) provided with a lens holding unit and an aperture which is located behind a lens that is set in the lens holding unit, (b) formed so that an aperture brim of the aperture is larger than the photographic element package to allow the photographic element package to move when inserted into the aperture brim, (c) has two contact surfaces that meet at the predetermined angle formed in the aperture brim, and (d) has the two contact surfaces positioned so that respective distances from the two contact surfaces to an optical axis of the lens are equal to the first offset amount and second offset amount of the light-sensitive surface of the photographic element; and a mounting member (a) which mounts and attaches the photographic element package onto the chassis in a state where the main surface of the photographic element package faces the lens through the aperture in the chassis and where the two standard surfaces are aligned with the two contact surfaces, (b) which includes an energizing unit, and (c) the energizing unit energizes the photographic element package in a direction perpendicular to the optical axis of the lens, as a result of the photographic element package being mounted onto the chassis, so that the two standard surfaces of the photographic element package firmly press against the two contact surfaces of the chassis.

With the stated construction, the standard surfaces of the photographic element package firmly press against the contact surfaces of the chassis so that the center of the light-sensitive surface of the photographic element is positioned on the optical axis of the lens. As a result, equipment for adjusting the optical axis of the lens is unnecessary and operations for centering the light-sensitive surface on the optical axis can be completely eradicated.

Here, a circuit board for a circuit that processes a signal generated by the photographic element may be provided on a back of the photographic element package, with the circuit board being integrated with the photographic element package via a connecting member, wherein the chassis may have at least one support part for supporting at least one part of the circuit board, and wherein the energizing unit of the mounting member may be an elastic member which, when the photographic element package is mounted onto the chassis, directly applies a force to side edges of the circuit board.

With the stated construction, the photographic element package will definitely be able to move within the aperture brim, and the standard surfaces will definitely press against the contact surfaces.

Here, the mounting member may have at least one pressing member for pressing the side edges of the circuit board onto the support part from behind when the photographic element package is mounted on the chassis.

With the stated construction, a circuit board can be attached to the chassis.

Here, the elastic member may be composed of a first spring for pressing the circuit board in a direction so that one of the standard surfaces firmly presses against one of the contact surfaces and a second spring for pressing the circuit board in another direction so that another of the standard surfaces firmly presses against another of the contact surfaces.

With the stated construction, the two standard surfaces will definitely press against the two contact surfaces.

Here, at least one fastening may be provided on the mounting member, and wherein at least one engagement part, which engages the fastening when the mounting member is moved parallel to the optical axis of the lens, may be provided on the chassis.

With the stated construction, the circuit board will be held sandwiched between chassis and the mounting member.

Here, the photographic element may be an area sensor composed of a CCD (Charge Coupled Device), and the photographic element package may be a construction where side and rear surfaces of the area sensor are covered in one of a ceramic material and a resinous material.

With the stated construction, it is no longer necessary to adjust the optical axis of a photographic element composed of a CCD.

The stated second object can be achieved when the mounting member is a case construction which entirely covers side and rear surfaces of the photographic element package, the case construction being composed of a back plate and side plates at sides of the back plate which protrude from the back plate, and the back plate and side plates being formed of a material that acts as a shield to electromagnetism, wherein the chassis is also formed of a material that acts as a shield to electromagnetism.

With the stated construction, unwanted external radiation can be prevented from entering the photographic element from outside.

Here, at least one fastening may be formed in the side plates of the mounting member, and at least one engagement part, which engages the fastening when the mounting member is moved parallel to the optical axis of the lens, may be provided at at least one corresponding position on the chassis.

Openings, into which front tips of the side plates of the mounting member can be inserted parallel to the optical axis of the lens, may also be provided in the chassis, wherein the fastening formed in the side plates may be an engagement hole, and wherein the engagement part may be an engagement peg which is provided inside at least one of the openings in the chassis.

With the stated construction, the photographic element package can be held enclosed within the chassis and the mounting member.

Here, a circuit board for a circuit that processes a signal generated by the photographic element may be provided on a back of the photographic element package, with the circuit board being integrated with the photographic element package via a connecting member, wherein the chassis may have at least one support part for supporting at least one part of the circuit board, wherein the energizing unit may be an elastic member which is provided on an inside of at least one of the side plates of the mounting member, and wherein the energizing unit may directly apply a force to side edges of the circuit board when the photographic element package is mounted onto the chassis.

With the stated construction, radiation generated at the photographic element and plate can be prevented from escaping to the outside.

Here, the first and second springs may each be composed of a plate spring which increases a force on the circuit board perpendicular to the optical axis of the lens as the side plates of the mounting member approach the openings in the chassis.

With the stated construction, the standard surfaces will come into complete contact with the contact surfaces when the photographic element package is mounted onto the chassis.

Here, at least one guide plate, for guiding the side plates of the mounting member into the openings, may be formed on the chassis, wherein each guide plate is positioned outside one of the openings.

With the stated construction, the mounting member can be easily mounted onto the chassis.

The stated first object can also be achieved by a mounting structure for a photographic element of a camera, including: a photographic element package (a) on whose main surface a light-sensitive surface of the photographic element is arranged, (b) in whose side surfaces two standard surfaces that meet at a predetermined angle are formed, and (c) where a center of the light-sensitive surface of the photographic element is defined as a point which is a first offset amount from one of the standard surfaces and a second offset amount from another of the standard surfaces; a chassis (a) provided with a lens holding unit and an aperture which is located behind a lens that is set in the lens holding unit, (b) formed so that an aperture brim of the aperture is larger than the photographic element package to allow the photographic element package to move when inserted into the aperture brim, (c) has two contact parts, for touching the two standard surfaces of the photographic element package and positioning the photographic element package, formed in the aperture brim, and (d) has the two contact parts provided at predetermined relative positions to an optical axis of the lens so that when the two contact parts touch the two standard surfaces, a center of the photographic element is aligned with the optical axis of the lens; and a mounting member (a) which mounts and fixes the photographic element package onto the chassis in a state where a main surface of the photographic element package faces the lens through the aperture in the chassis and where the two standard surfaces are aligned with the two contact parts, (b) which includes an energizing unit, and (c) the energizing unit energizes the photographic element package in a direction perpendicular to the optical axis of the lens, as a result of the photographic element package being mounted onto the chassis, so that the two standard surfaces of the photographic element package firmly press against the two contact surfaces of the chassis.

With the stated construction, equipment for adjusting the optical axis of the lens is unnecessary and operations for centering the light-sensitive surface on the optical axis can be completely eradicated.

Here, each of the two contact parts may be a surface.

Also, each of the two contact parts may be corrugated in form and may touch a corresponding standard surface in at least two places.

With the stated construction, the center of the light-sensitive surface of the photographic element can be aligned with the optical axis of the lens.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

The following is a description of an embodiment of the photographic element mounting structure for a camera to which the present invention relates.

Figure 1:
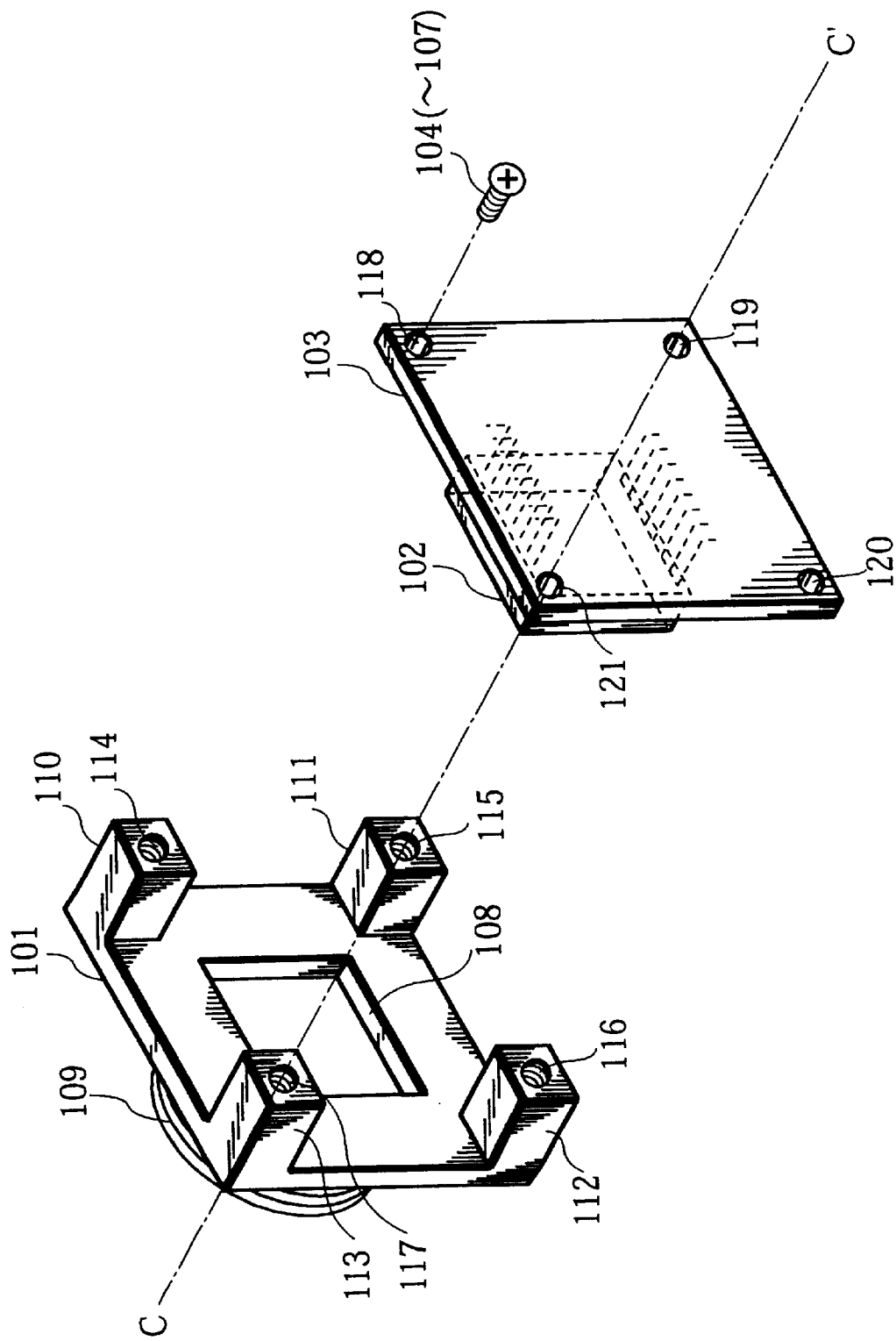
FIG. 1 is an exploded perspective drawing showing a conventional mounting structure for a photographic element.
Figure 2:
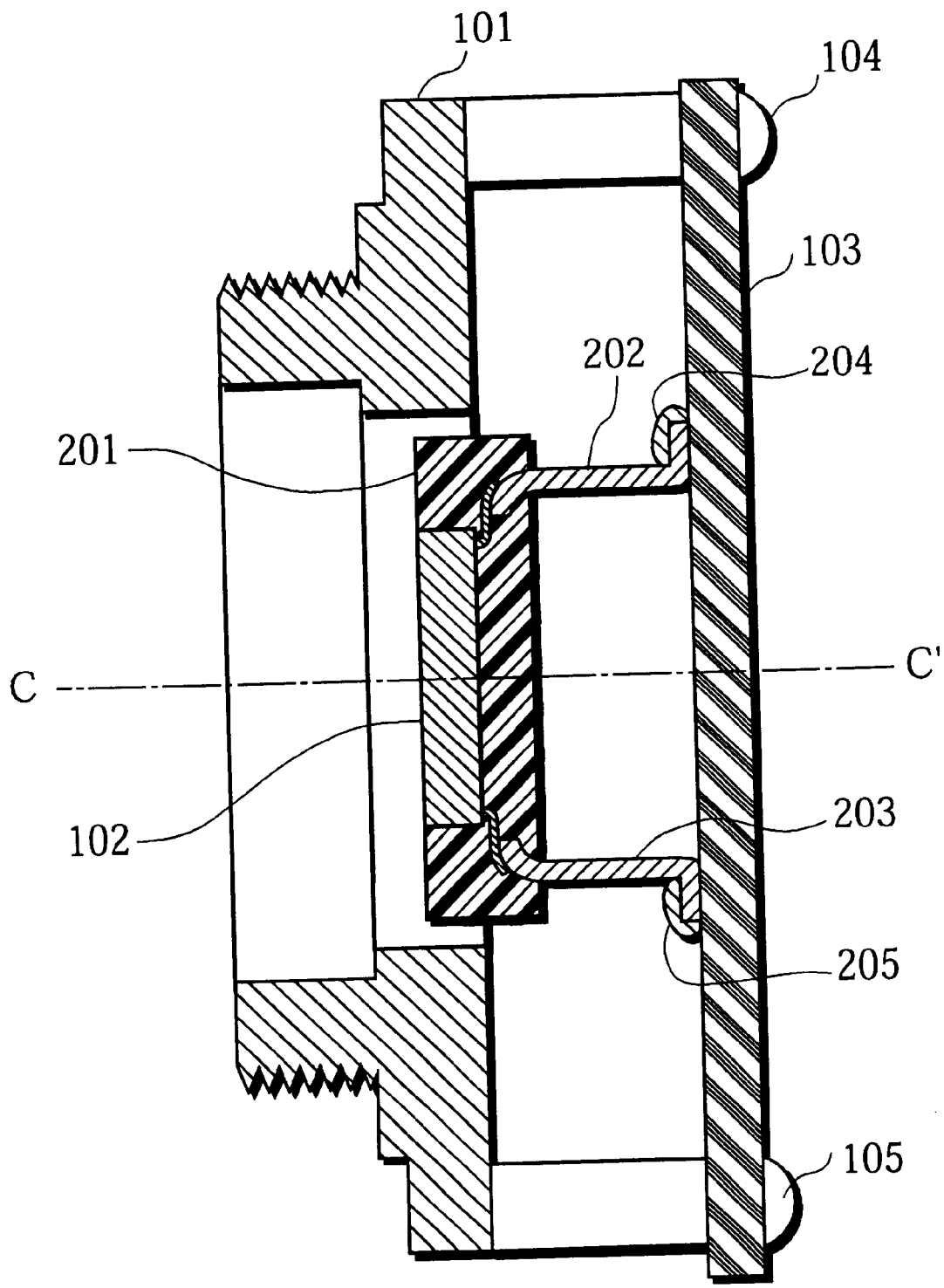
FIG. 2 is a cross-section of the conventional mounting structure taken parallel to the optical axis C–C' of the lens.
Figure 3:
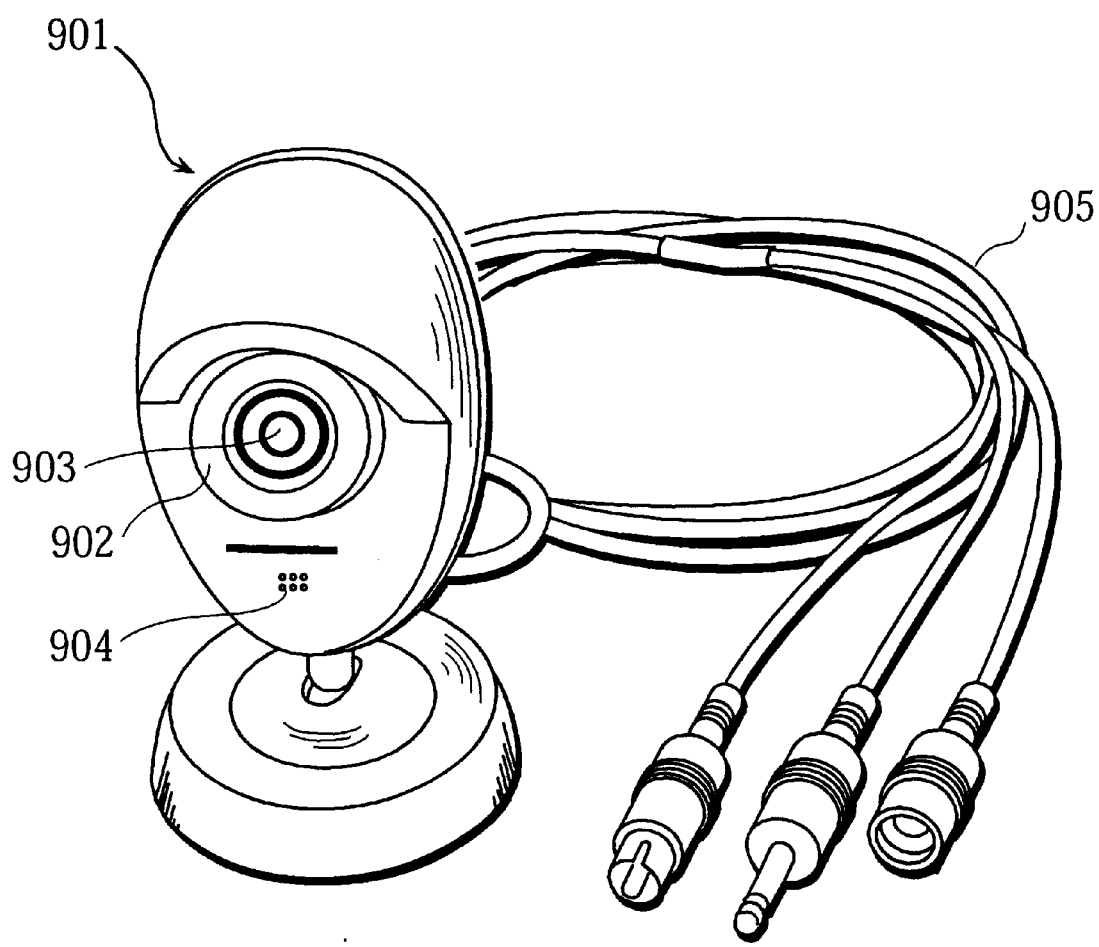
FIG. 3 shows the appearance of a video camera which uses the mounting structure for a photographic element to which the present invention relates.

A video camera which uses the photographic element mounting structure of the present invention will first be described. FIG. 3 shows the appearance of this video camera. As shown in FIG. 3, the video camera is enclosed by the case 901 with the lens cover 902 and the lens 903 visible. A microphone 904 is also provided in the case 901 and the camera is connected to a peripheral device by the cables 905.

Figure 4:
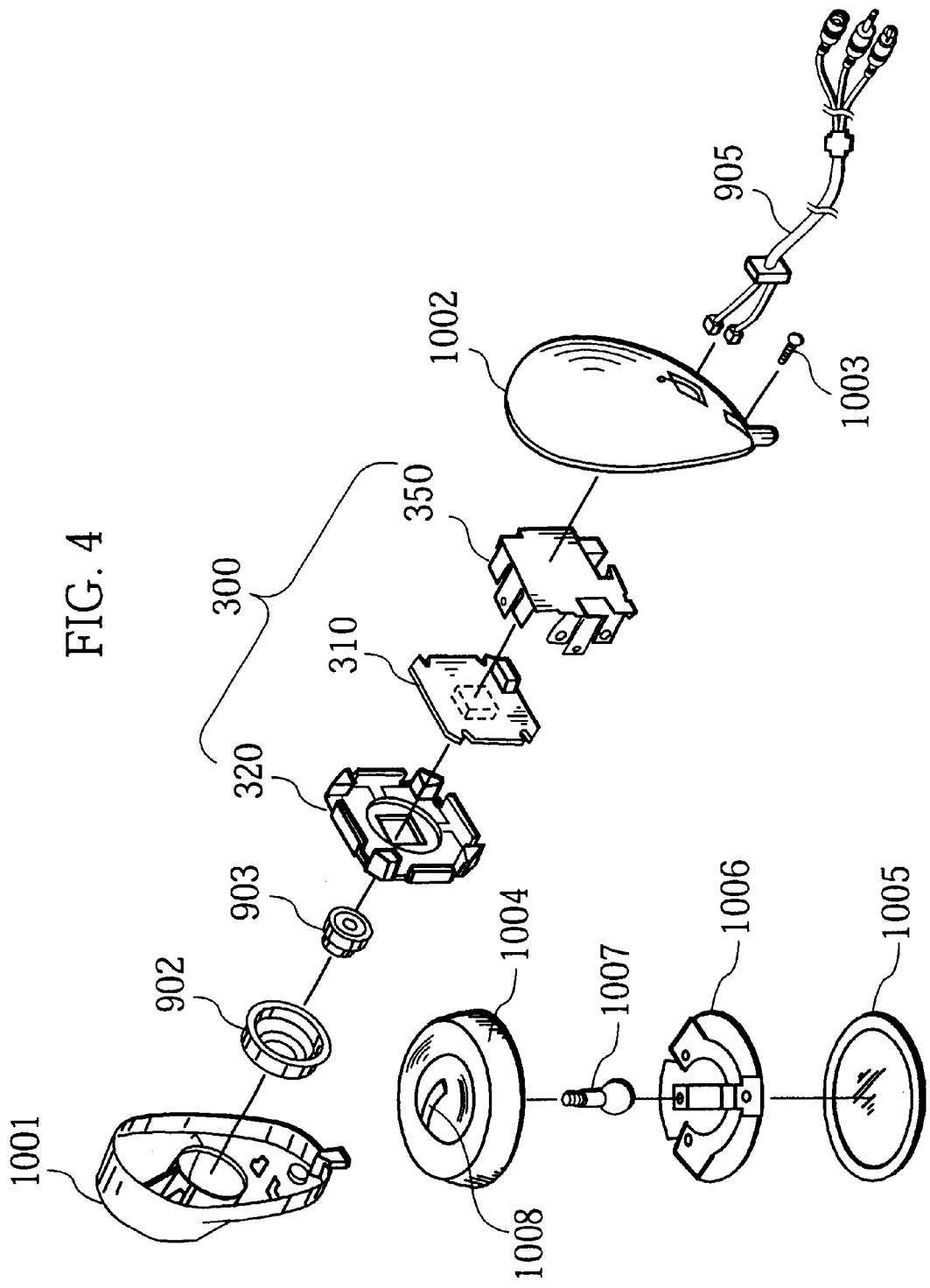
FIG. 4 is an exploded perspective view of the video camera shown in FIG. 3.

FIG. 4 is an exploded perspective view of the video camera. This video camera includes a photographic element mounting structure 300, where the substrate 310 is attached to the chassis 320 by the mounting plate 350, and a lens casing 902, into which the lens 903 is mounted. These are held between the front casing 1001 and the rear casing 1002 by the screw 1003. The supply of electric power to components such as the photographic element 301 and the transfer of signals from components such as the photographic element 301 to the periphery is performed via the cables 905. The case 901, composed of the front casing 1001 and the rear casing 1002, is mounted on the ball pin 1007 which is supported by the mounting 1006 that is sandwiched between the base cover 1004 and the base plate 1005. As a result, the case 901 is free to move back and forth within the slit 1008 in the base cover 1004.

Figure 5:
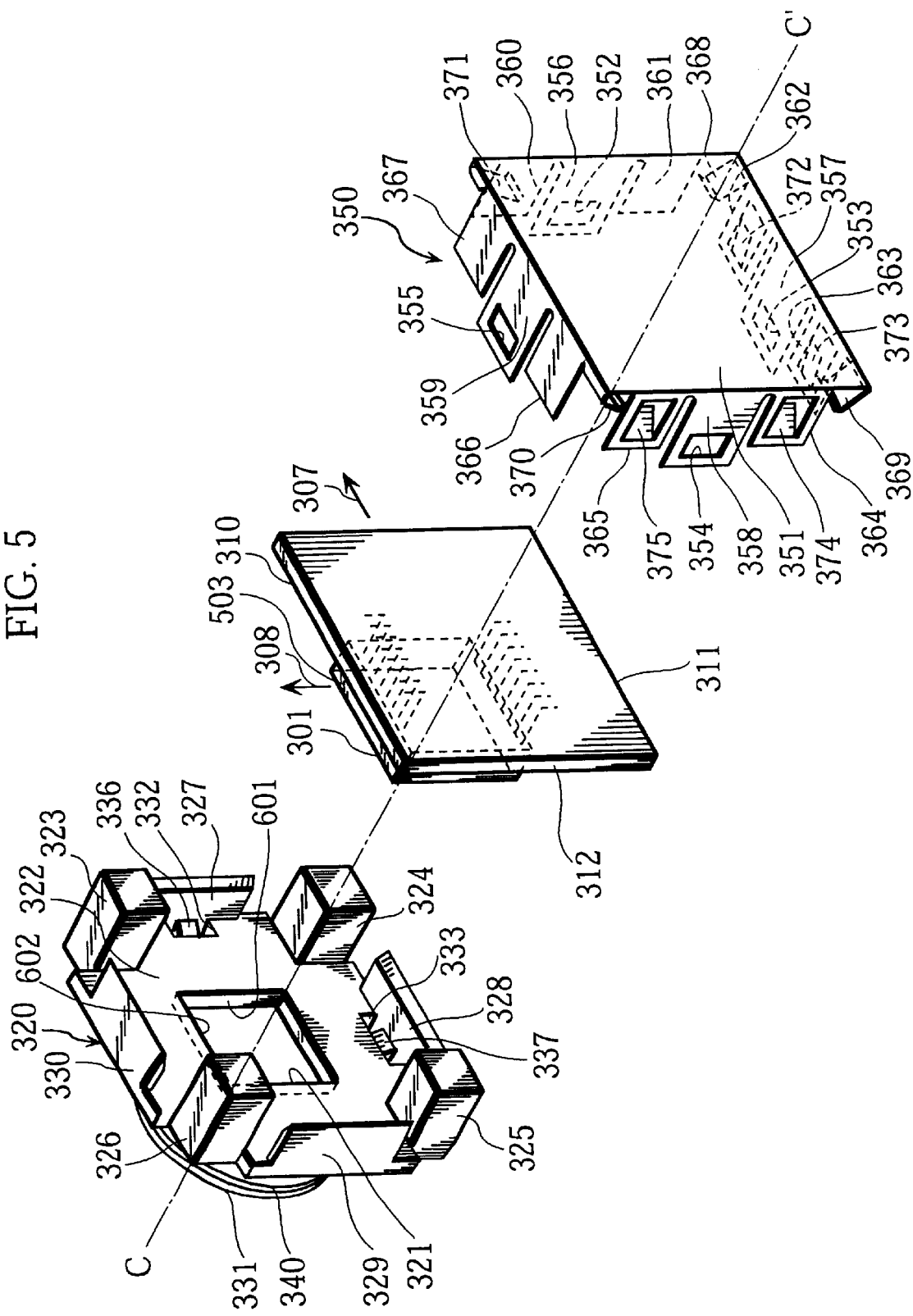
FIG. 5 is an exploded perspective view of the photographic element mounting structure of the first embodiment of the present invention.
Figure 6:
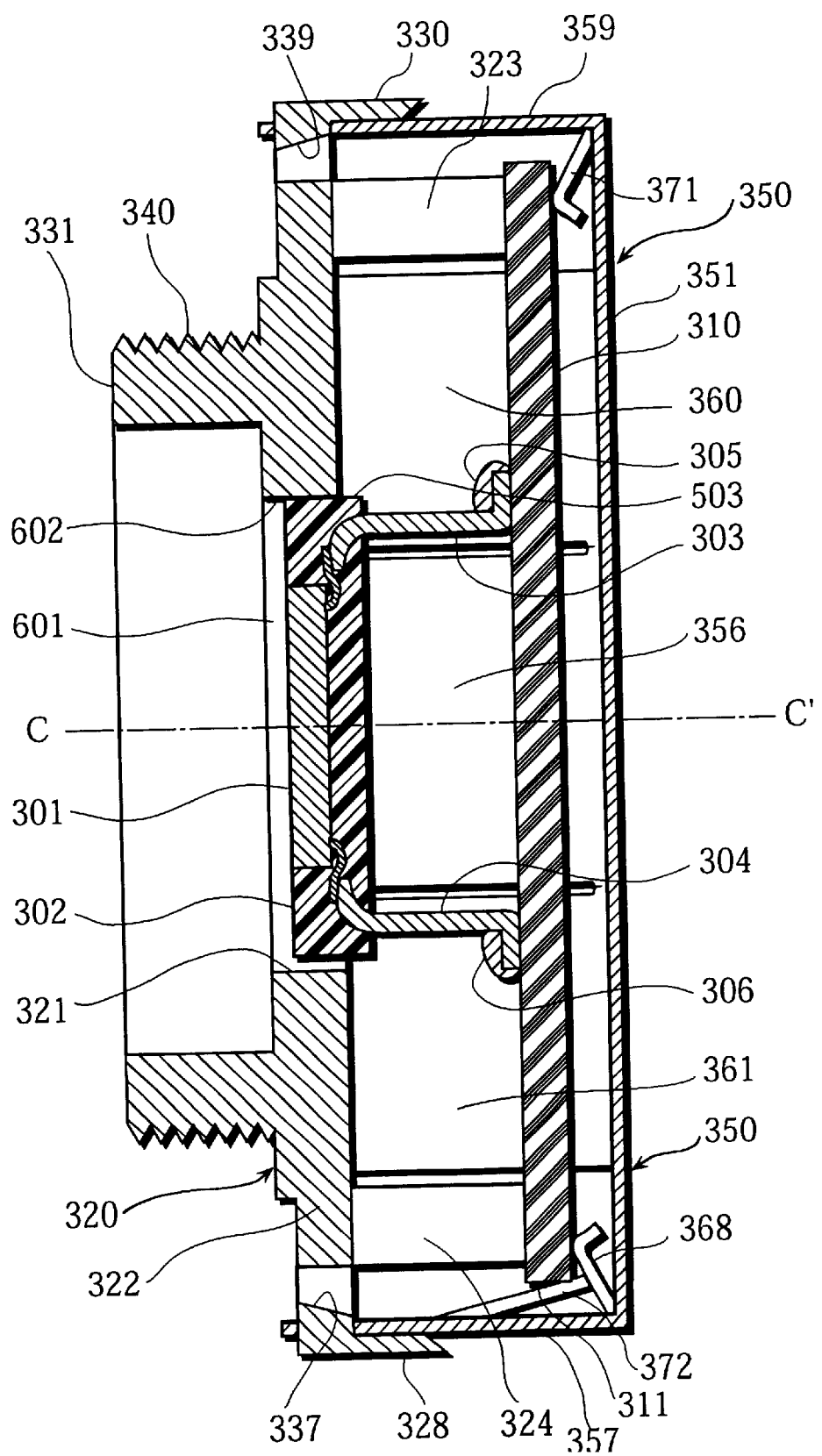
FIG. 6 is a cross section of the photographic element mounting structure of the present embodiment, taken parallel to the optical axis C–C' of the lens.

FIG. 5 is an exploded perspective drawing of the photographic element mounting structure for a camera according to the first embodiment of the present invention. FIG. 6 is a cross section of the photographic element mounting structure taken parallel to the optical axis C–C' of the lens indicated in FIG. 5.

The present photographic element mounting structure is composed of the photographic element 301, the substrate 310 onto which the photographic element 301 is integrally mounted, the chassis 320 into which the aperture brim 321 (into which the photographic element 301 is inserted) is formed and onto which the lens casing 902 is mounted, and the mounting plate 350 for mounting the substrate 310 onto the chassis 320.

Figure 7:
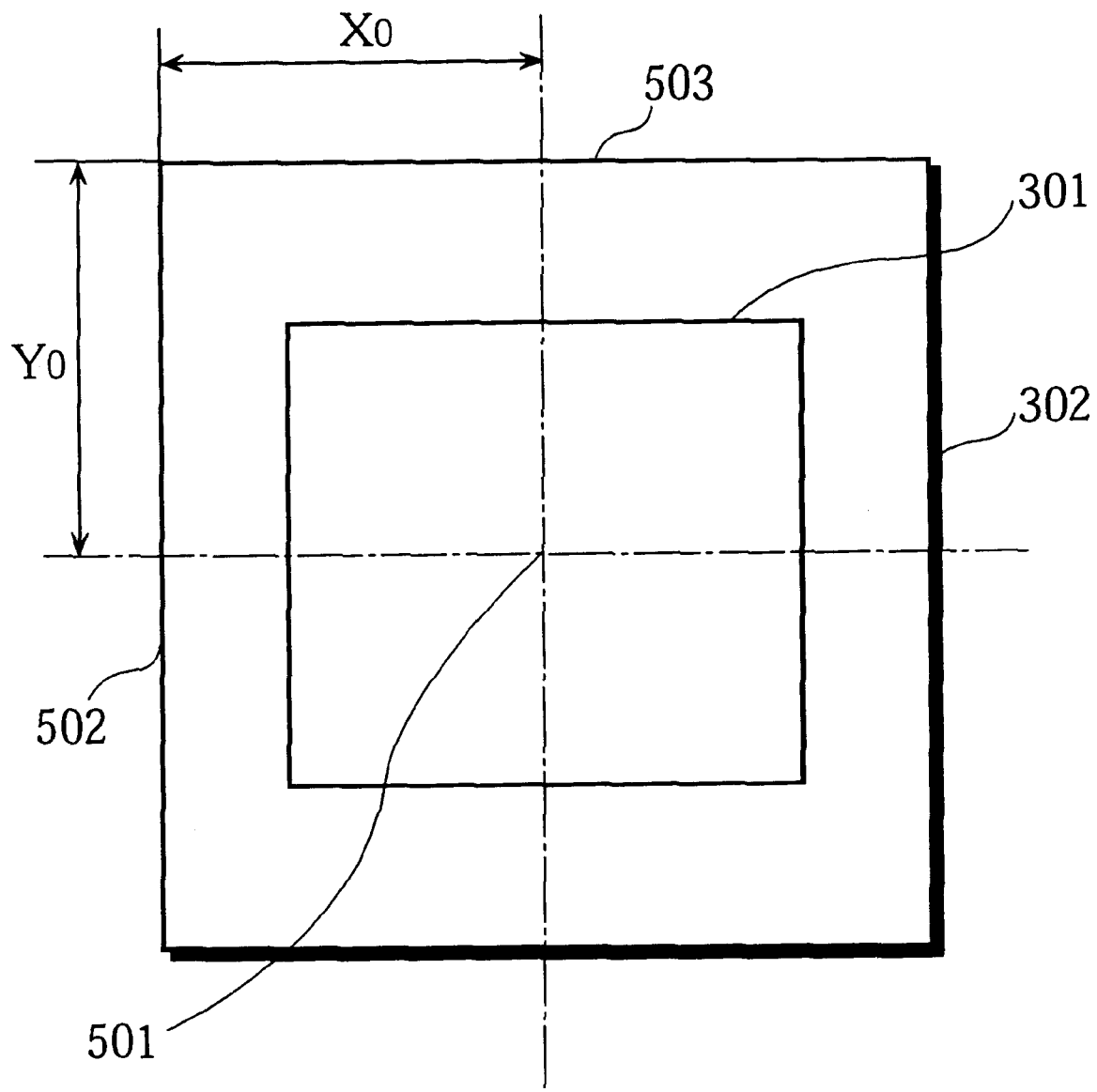
FIG. 7 is an elevation of the substrate side of the photographic element package of the present invention.

FIG. 7 is an elevation of the photographic element 301 when viewed from the aperture brim 321 side of the chassis 320 shown in FIG. 6.

The photographic element 301 can be composed of a semiconductor element, such as a CCD. This photographic element 301 is integrally formed with a protective package of a ceramic or resinous material as a photographic element package 302. The pins 303, 304 which extend from the photographic element package 302 toward the substrate 310 are attached to the substrate 310 by the solder 305, 306, so that the photographic element package 302 is firmly attached to the substrate 310 as an integral body.

It should be noted that in the present embodiment the photographic element package 302 is described as being soldered onto the substrate 310, although it is equally possible for the photographic element package 302 to be attached by having pins 303, 304 or the like inserted into sockets formed on the substrate 310.

In FIG. 7, the left face and upper face of the photographic element package 302 are respectively set as the X-axis standard face 502 and the Y-axis standard face 503. Here, the photographic element 301 is fitted into the protective package so that the center of the photographic element 301 is positioned at a predetermined distance X0 to the right (i.e., in the X-axis) from the X-axis standard face 502 and a predetermined distance Y0 below (i.e., in the Y-axis) the Y-axis standard face 503.

As one example, when the external dimensions of the photographic element package 302 are 10 mm by 10 mm, the allowable error for the positioning of the photographic element 301 is +0.2 mm.

Figure 8:
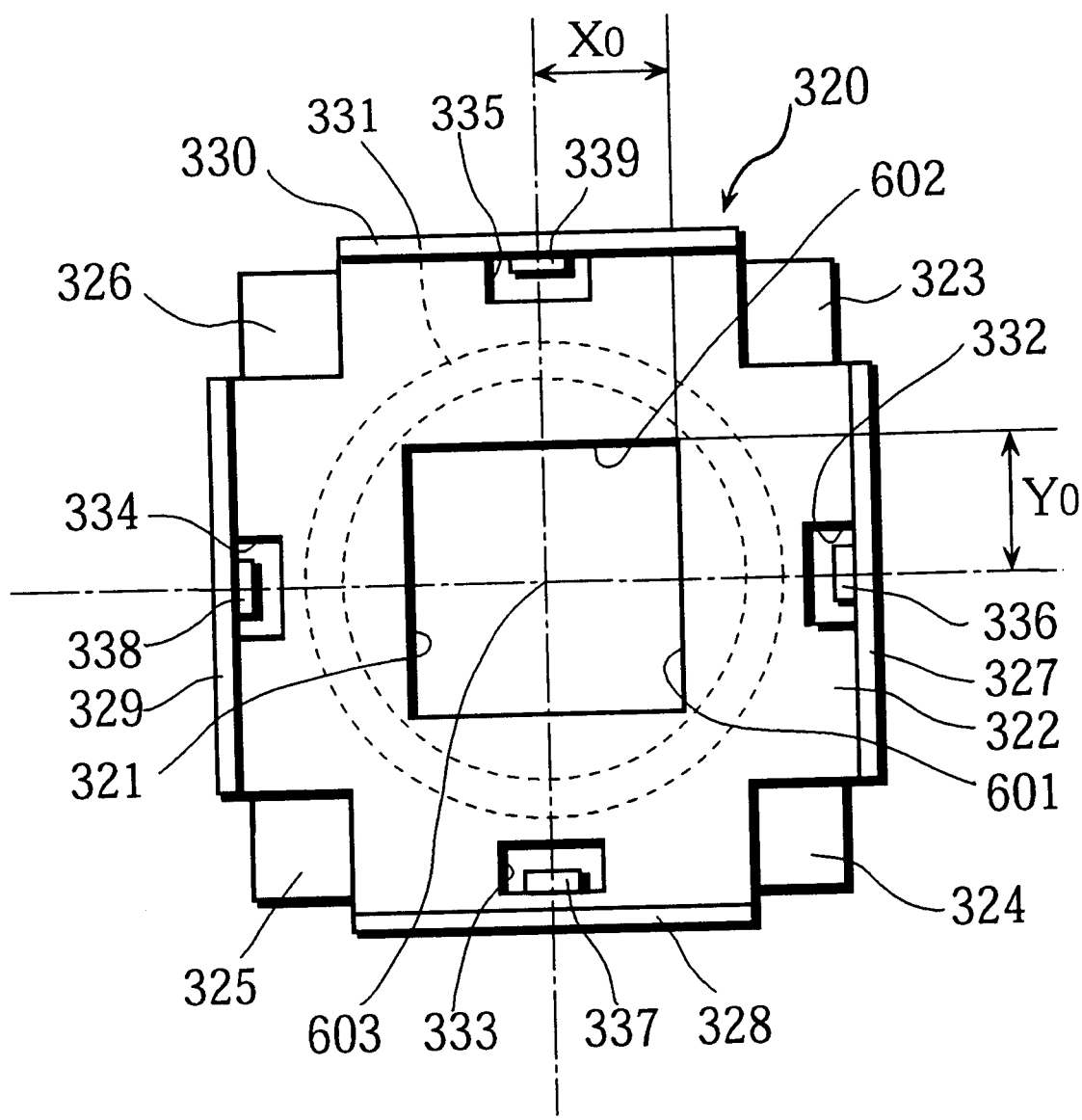
FIG. 8 is an overhead view of the substrate side of the chassis of the present embodiment.

FIG. 8 is an elevation of the chassis 320 taken from the substrate 310 side. Hereinafter, this viewpoint will be referred to as "behind the camera", so that the face of the chassis visible from behind the camera is the "rear face" and the opposite face is the "front face".

A cylinder-shaped lens holding unit 331 is formed on the front face of the chassis main plate 322. On the rear face, substrate supporting pillars 323, 324, 325, and 326 are provided at the four corners, with guide plates 327, 328, 329, and 330 protruding from the edges of the chassis 320 except at the corners.

An aperture with aperture brim 321 is formed in the center of the chassis main plate 322 and guide holes 332, 333, 334, and 335 are formed at positions on the inside of the guide plates 327, 328, 329, and 330. Engagement pegs 336, 337, 338, and 339 are respectively formed inside these guide holes 332, 333, 334, and 335.

The aperture brim 321 is formed as a surface that is perpendicular to the optical axis C–C' of the mounted lens 903 and is sufficiently large that the photographic element package 302 fixed to the substrate 310 may move when inserted. Within the aperture brim 321, an X-axis contact surface 601 and a Y-axis contact surface 602 are formed at one corner corresponding to the X-axis standard face 502 and the Y-axis standard face 503 of the photographic element package 302.

In FIG. 8, a position at the distance X0 from the X-axis contact surface 601 of the right face of the aperture brim 321 in a leftward direction parallel to the Y-axis contact surface 602 and the distance Y0 from the Y-axis contact surface 602 of the top face of the aperture brim 321 in a downward direction parallel to the X-axis contact surface 601 is the center axis 603 of the lens holding unit 331. This is to say, the X-axis contact surface 601 and the Y-axis contact surface 602 are precision-manufactured so that this position is on the optical axis C–C' of the lens 903.

It should be noted that the size of the aperture brim 321 will differ depending on the external dimensions of the photographic element package 302 which is inserted, although as one example, when the external dimensions of the photographic element package 302 are 10 mm by 10 mm, the aperture brim 321 can be 10.6 mm by 10.6 mm.

The guide plates 327, 328, 329 and 330 are formed so that their leading edges are tapered toward the outside of the chassis main plate 322.

A male screw thread 340 onto which the lens casing 902 is screwed is formed in the outer cylindrical surface of the lens holding unit 331.

The chassis 320 is manufactured using a material, such as aluminum, which acts as a shield to electromagnetism. It should be noted here that this chassis 320 is manufactured using a die-cast manufacturing process.

As shown in FIG. 5, the mounting plate 350 is formed of a rear plate 351 which is slightly larger than the substrate 310, insertion plates 356, 357, 358, and 359 which extend out perpendicular to each edge of the rear plate 351, cover plates 360, 361, 362, 363, 364, 365, 366, and 367, and substrate holding plate springs 368, 369, 370, and 371.

Engagement holes 352, 353, 354, and 355, for engaging the engagement pegs 336, 337, 338, and 339 formed inside the guide holes 332, 333, 334, and 335 in the chassis 320, are respectively formed in the insertion plates 356, 357, 358, and 359.

Cover plates 360–367 are formed on both sides of each of the insertion plates 356, 357, 358, and 359, and serve to ensure that electromagnetic radiation from the substrate does not reach the exterior when the photographic element package 302 is mounted onto the chassis 320.

The substrate holding plate springs 368, 369, 370, and 371 apply an elastic force onto the substrate supporting pillars 323, 324, 325, and 326 to support the substrate 310 when the photographic element package 302 is mounted onto the chassis 320. Package pressing plate springs 372 and 373 are cut out of the cover plates 362 and 363, so that when the photographic element package 302 is mounted onto the chassis 320, the package pressing plate springs 372 and 373 come into contact with the side face 311 of the substrate 310 and press the substrate 310 in the direction shown by the arrow 308. In the same way, package pressing plate springs 374 and 375 are cut out of the cover plates 364 and 365, so that when the photographic element package 302 is mounted onto the chassis 320, the package pressing plate springs 374 and 375 come into contact with the side face 312 of the substrate 310 and press the substrate 310 in the direction shown by the arrow 307.

Since the substrate 310 is pressed in the direction shown by the arrow 308, the Y-axis standard face 503 of the photographic element package 302 shown in FIG. 7 comes into contact with the Y-axis contact surface 602 of the chassis 320. Similarly, since the substrate 310 is also pressed in the direction shown by the arrow 307, the X-axis standard face 502 of the photographic element package 302 comes into contact with the X-axis contact surface 601 of the chassis 320. As a result, the center axis 603 of the lens holding unit 331 and the center 501 of the photographic element 301 are both definitely aligned on the optical axis C–C' of the lens.

The mounting plate 350 is manufactured using a material, such as a stainless steel plate, which acts as a shield to electromagnetism.

It should be noted here that electric circuits are formed on both sides of the substrate 310, although these have been omitted from the drawings.

Figure 9:
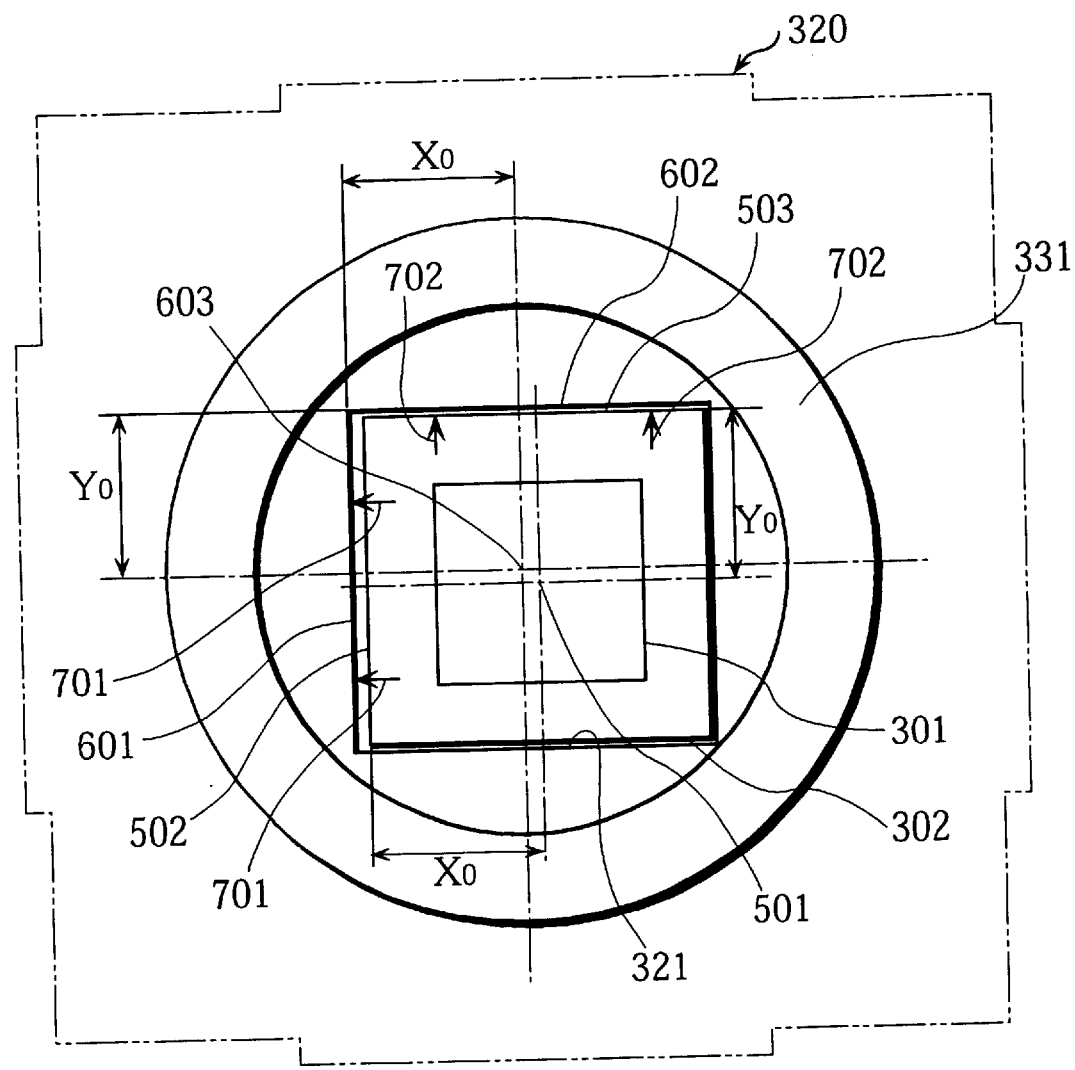
FIG. 9 shows the mounted state of the substrate 310 of the present embodiment.
Figure 10:
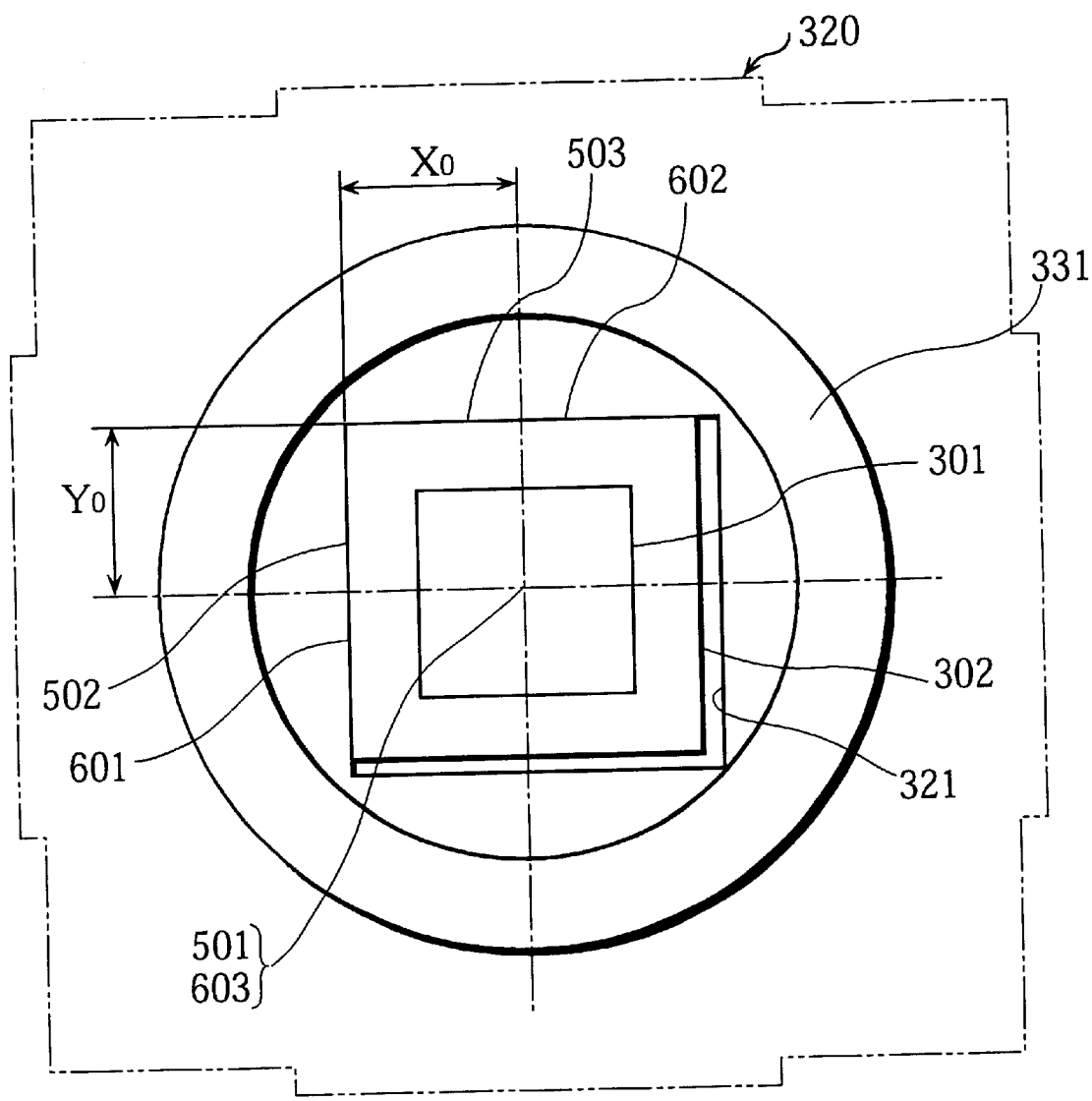
FIG. 10 shows the state where the standard surface of the photographic element package of the present embodiment and the contact surface of the aperture are in contact.

The following is an explanation of the assembly of the photographic element mounting structure, with reference to FIGS. 9 and 10. FIGS. 9 and 10 are simplified elevations taken from the front of the camera.

First, the photographic element 301 side of the substrate 310 is placed onto the substrate supporting pillars 323, 324, 325, and 326 of the chassis 320.

It should be noted here that the assembler can easily know the correct orientation whereby the X-axis and Y-axis standard faces 502 and 503 definitely come into contact with the X-axis and Y-axis contact surfaces 601 and 602 from the actual positioning of the electronic components and connectors in the circuits provided on both sides of the substrate 310.

As shown in FIG. 9, the photographic element package 302 is inserted into the aperture brim 321. In this state, the center 501 of the photographic element package 302 and the center axis 603 of the lens holding unit 331 will not be in alignment.

Next, the insertion plates 356, 357, 358, and 359 of the mounting plate 350 are pushed inside the guide plates 327, 328, 329 and 330 of the chassis 320 from behind the substrate 310. As a result, the package pressing plate springs 374 and 375 press the substrate 310 in the direction shown by the arrow 307 in FIG. 5 and move the photographic element package 302 in the direction shown by the arrow 701 in FIG. 9, so that the X-axis standard face 502 comes into contact with the X-axis contact surface 601 of the chassis 320. At the same time, the package pressing plate springs 372 and 373 press the substrate 310 in the direction shown by the arrow 308 in FIG. 5 and move the photographic element package 302 in the direction shown by the arrow 702 in FIG. 9, so that the Y-axis standard face 503 comes into contact with the Y-axis contact surface 602 of the chassis 320. As a result, the center 501 of the photographic element package 302 and the center axis 603 of the lens holding unit 331 come into perfect alignment on the optical axis C–C' of the lens 903.

Due to the effect of the structure described above, conventionally performed complex assembly procedures to ensure that the center of the photographic element 102 is aligned with the optical axis C–C' of the lens are no longer necessary. This represents a remarkable improvement in the mounting procedure for photographic elements.

By pressing mounting plate 350 into the chassis 320, the substrate holding plate springs 368, 369, 370, and 371 press the substrate 310 against the substrate supporting pillars 323, 324, 325, and 326 of the chassis 320. The insertion plates 356, 357, 358, and 359 and are guided by the guide plates 327, 328, 329, and 330 are inserted into the guide holes 332, 333, 334, and 335 of the chassis 320, where the engagement pegs 336, 337, 338, and 339 engage the engagement holes 352, 353, 354, and 355, thereby completing the assembly of the photographic element mounting structure.

It should be noted here that in the present embodiment, the chassis 320 was described as being manufactured using aluminum and the mounting plate 350 was described as using stainless steel, although both components may be produced using other materials which act as shields to electromagnetism (or in other words, electrical conductors). As examples, other metals may be used for the chassis 320 and the mounting plate 350, such as copper or steel, or electrically conductive plastics. Examples of electrically conductive plastics are ABS resin and polycarbonate which have been impregnated with stainless steel fibers or zinc oxide.

It is also possible to manufacture the chassis 320 or mounting plate 350 out of engineering plastic such as ABS resin or polycarbonate and then cover the surface with metal such as copper or nickel by plating or vapor deposition.

In the present embodiment, the X-axis standard face 502 and the Y-axis standard face 503 were described as being two faces that meet at a right angle, although it is also possible for the standard faces to be formed so as to meet at a predetermined angle so that they come into contact with the X-axis contact surface 601 and the Y-axis contact surface 602 at the predetermined angle.

In the present embodiment, the X-axis contact surface 601 and the Y-axis contact surface 602 are described as being formed of flat surfaces, although these contact surfaces may be corrugated and so come in contact with the X-axis standard face 502 and Y-axis standard face 503 in two or more places.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A mounting structure for a photographic element of a camera, comprising:
    a photographic element package
        (a) on whose main surface a light-sensitive surface of the photographic element is arranged,
        (b) in whose side surfaces two standard surfaces that meet at a predetermined angle are formed, and
        (c) where a center of the light-sensitive surface of the photographic element is defined as a point which is a first offset amount from one of the standard surfaces and a second offset amount from another of the standard surfaces;
    a chassis
        (a) provided with a lens holding unit and an aperture which is located behind a lens that is set in the lens holding unit,
        (b) formed so that an aperture brim of the aperture is larger than the photographic element package to allow the photographic element package to move when inserted into the aperture brim,
        (c) has two contact surfaces that meet at the predetermined angle formed in the aperture brim, and
        (d) has the two contact surfaces positioned so that respective distances from the two contact surfaces to an optical axis of the lens are equal to the first offset amount and second offset amount of the light-sensitive surface of the photographic element;
    and a mounting member
        (a) which mounts and attaches the photographic element package onto the chassis in a state where the main surface of the photographic element package faces the lens through the aperture in the chassis and where the two standard surfaces are aligned with the two contact surfaces,
        (b) which includes an energizing means, and
        (c) the energizing means energizes the photographic element package in a direction perpendicular to the optical axis of the lens, as a result of the photographic element package being mounted onto the chassis, so that the two standard surfaces of the photographic element package firmly press against the two contact surfaces of the chassis.

2. The mounting structure of claim 1,
    wherein a circuit board for a circuit that processes a signal generated by the photographic element is provided on a back of the photographic element package, with the circuit board being integrated with the photographic element package via a connecting member,
    wherein the chassis has at least one support part for supporting at least one part of the circuit board, and
    wherein the energizing means of the mounting member is an elastic member which, when the photographic element package is mounted onto the chassis, directly applies a force to side edges of the circuit board.

3. The mounting structure of claim 2,
    wherein the mounting member has at least one pressing member for pressing the side edges of the circuit board onto the support part from behind when the photographic element package is mounted on the chassis.

4. The mounting structure of claim 3,
    wherein the elastic member is composed of a first spring for pressing the circuit board in a direction so that one of the standard surfaces firmly presses against one of the contact surfaces and a second spring for pressing the circuit board in another direction so that another of the standard surfaces firmly presses against another of the contact surfaces.

5. The mounting structure of claim 1,
    wherein at least one fastening is provided on the mounting member, and
    wherein at least one engagement part, which engages the fastening when the mounting member is moved parallel to the optical axis of the lens, is provided on the chassis.

6. The mounting structure of claim 5,
    wherein a circuit board for a circuit that processes a signal generated by the photographic element is provided on a back of the photographic element package, with the circuit board being integrated with the photographic element package via a connecting member,
    wherein the chassis has at least one support part for supporting at least one part of the circuit board, and wherein the energizing means of the mounting member is an elastic member which, when the photographic element package is mounted onto the chassis, directly applies a force to side edges of the circuit board.

7. The mounting structure of claim 6, wherein the mounting member has at least one pressing member for pressing the side edges of the circuit board onto the support part from behind when the photographic element package is mounted on the chassis.

8. The mounting structure of claim 7, wherein the elastic member is composed of a first spring for pressing the circuit board in a direction so that one of the standard surfaces firmly presses against one of the contact surfaces and a second spring for pressing the circuit board in another direction so that another of the standard surfaces firmly presses against another of the contact surfaces.

9. The mounting structure of claim 8, wherein the photographic element is an area sensor composed of a CCD (Charge Coupled Device), and the photographic element package is a construction where side and rear surfaces of the area sensor are covered in one of a ceramic material and a resinous material.

10. The mounting structure of claim 1, wherein the mounting member is a case construction which entirely covers side and rear surfaces of the photographic element package, the case construction being composed of a back plate and side plates at sides of the back plate which protrude from the back plate, and the back plate and side plates being formed of a material that acts as a shield to electromagnetism, wherein the chassis is also formed of a material that acts as a shield to electromagnetism.

11. The mounting structure of claim 10, wherein at least one fastening is formed in the side plates of the mounting member, and wherein at least one engagement part, which engages the fastening when the mounting member is moved parallel to the optical axis of the lens, is provided at at least one corresponding position on the chassis.

12. The mounting structure of claim 11, wherein openings, into which front tips of the side plates of the mounting member can be inserted parallel to the optical axis of the lens, are provided in the chassis, wherein the fastening formed in the side plates is an engagement hole, and wherein the engagement part is an engagement peg which is provided inside at least one of the openings in the chassis.

13. The mounting structure of claim 11, wherein a circuit board for a circuit that processes a signal generated by the photographic element is provided on a back of the photographic element package, with the circuit board being integrated with the photographic element package via a connecting member, wherein the chassis has at least one support part for supporting at least one part of the circuit board, wherein the energizing means is an elastic member which is provided on an inside of at least one of the side plates of the mounting member, and wherein the energizing means directly applies a force to side edges of the circuit board when the photographic element package is mounted onto the chassis.

14. The mounting structure of claim 13, wherein the elastic member is composed of a first spring for pressing the circuit board in a direction so that one of the standard surfaces firmly presses against one of the contact surfaces and a second spring for pressing the circuit board in another direction so that another of the standard surfaces firmly presses against another of the contact surfaces.

15. The mounting structure of claim 14, wherein the first and second springs are each composed of a plate spring which increases a force on the circuit board perpendicular to the optical axis of the lens as the side plates of the mounting member approach the openings in the chassis.

16. The mounting structure of claim 15, wherein at least one guide plate, for guiding the side plates of the mounting member into the openings, is formed on the chassis, wherein each guide plate is positioned outside one of the openings.

17. The mounting structure of claim 16, wherein the photographic element is an area sensor composed of a CCD (Charge Coupled Device), and the photographic element package is a construction where side and rear surfaces of the area sensor are covered in one of a ceramic material and a resinous material.

18. A mounting structure for a photographic element of a camera, comprising:

a photographic element package
  (a) on whose main surface a light-sensitive surface of the photographic element is arranged,
  (b) in whose side surfaces two standard surfaces that meet at a predetermined angle are formed, and
  (c) where a center of the light-sensitive surface of the photographic element is defined as a point which is a first offset amount from one of the standard surfaces and a second offset amount from another of the standard surfaces;

a chassis
  (a) provided with a lens holding unit and an aperture which is located behind a lens that is set in the lens holding unit,
  (b) formed so that an aperture brim of the aperture is larger than the photographic element package to allow the photographic element package to move when inserted into the aperture brim,
  (c) has two contact parts, for touching the two standard surfaces of the photographic element package and positioning the photographic element package, formed in the aperture brim, and
  (d) has the two contact parts provided at predetermined relative positions to an optical axis of the lens so that when the two contact parts touch the two standard surfaces, a center of the photographic element is aligned with the optical axis of the lens; and a mounting member
  (a) which mounts and fixes the photographic element package onto the chassis in a state where a main surface of the photographic element package faces the lens through the aperture in the chassis and where the two standard surfaces are aligned with the two contact parts,
(b) which includes an energizing means, and
(c) the energizing means energizes the photographic element package in a direction perpendicular to the optical axis of the lens, as a result of the photographic element package being mounted onto the chassis, so that the two standard surfaces of the photographic element package firmly press against the two contact surfaces of the chassis.

19. The mounting structure of claim 18, wherein each of the two contact parts is a surface.

20. The mounting structure of claim 18, wherein each of the two contact parts is corrugated in form and touches a corresponding standard surface in at least two places.

* * * * *